United States Patent [19]
Barbera

[11] Patent Number: 5,699,618
[45] Date of Patent: Dec. 23, 1997

[54] PASTA TOOLS

[76] Inventor: Michael Edward Barbera, 13314 Corte De Estepona, San Diego, Calif. 92128

[21] Appl. No.: 579,353

[22] Filed: Dec. 27, 1995

[51] Int. Cl.[6] .................................................. A47J 43/28
[52] U.S. Cl. .................................................. 30/322; D7/653
[58] Field of Search .......................... 30/322, 323, 298; D7/645, 653

[56] References Cited

FOREIGN PATENT DOCUMENTS 17079 of 1899 United Kingdom .................. 30/322

OTHER PUBLICATIONS

Tableware International, Apr. 1987, p. 74.

*Primary Examiner*—Douglas D. Watts

[57] ABSTRACT

A pair of salad and pasta tossing tools for operating with each other to assist in tossing salads, pastas, and similar objects, which tools have proportionally broad shaft, or handle that is an enlarged, widened gripable portion, and from which protrude several tines or pointed elements extending substantially parallel to each other at the other end. The several protruding elements, usually three in number, are generally "V" shaped. This tool is shaped to comfortably fit against the heel of the hand, with the four opposing fingers, opposing and gripping the tool against the shaft, such that the protruding elements or tines of each tool when used in pairs, one for each hand, co-act to lift and encompass a portion of the salad greens or pasta, to be raised or lifted from their container for "tossing."

8 Claims, 1 Drawing Sheet

PASTA TOOLS

FIELD OF INVENTION

The present invention is a type of kitchen or food service utensil, which is commonly referred to as kitchenware or wooden ware, which is used in the preparation and service of food.

This device relates to the culinary equipment used and useful in the making and mixing of salads and pastas, and similar loose food parts with liquid and solid components. The components of the salads and pasta or other food concoctions may have been placed in a large container in serial order or in layers and must be later relatively uniformly mixed for service.

This device, with relatively broad multiple tines on each of the tool pair, forming a stubby spade like assemblage, quickly easily, and rapidly achieves a substantially uniform mixture and service of the food parts.

It is the primary objective of the pasta hands to provide two basic functions for a user involved in the tossing of the mixture of pasta or other food items. The first function is the manipulation, mixing and stirring of pasta or other food items. The second function is the individual service of the pasta salad or other food items after the materials are mixed.

Another objective of the "pasta hands" is to provide two matched pieces, which are placed in each hand and are used to manipulate, mix and serve pasta and other food items. An additional objective is to provide the pasta hands in a form that is economical to manufacture.

A further objective is to provide the pasta hands that will make a clean, sanitary, pleasant appearing presentation in a place or restaurant that serves salad, pasta and other food items to customers.

DESCRIPTION OF RELATED ART

In the art of culinary tools there is a large variety of forks and fork like devices which have been granted U.S. and other patent registrations.

For Example:

a. The U.S. Pat. No. 4,835,864 discloses a combination fork/spoon utensil used for eating. This design displays the drawback that it is used as an eating utensil, and is therefore not adapted to the broad shovel-like lifting operation of tossing the salad.

b. The U.S. Pat. No. 4,969,268 discloses a wooden ware type of kitchen utensil for serving food which is made from plastic. This design necessitates, that the device be made from plastic and not wood, and although it may be used for serving food, is primarily a one-handed device with a long handle c. The U.S. Pat. No. 5,175,933 discloses a pizza fork apparatus for ease of cutting and spearing food items. This design displays the drawback that it is a one handed device with a long handle made like a spatula and is used to lift and cut the food and does not work cooperatively by cooperating with a two handed action.

d. The British patent #2,541; Feb. 25, 1885; discloses an improvement in the manufacture of a fork. This design displays the basic drawback that it is used primarily as an eating utensil, and thus does not bring both hands in to a cooperative lifting coaction.

These devices teach various aspects of handling "dry" and cooked spaghetti (pasta), and also show how to serve salads and pastas from a bowl, but do not teach the preparatory step of "tossing salads".

But, none of the above listed U.S. patents direct their attention to the art of a new tool for mixing the separated ingredients, to create or prepare a "tossed salad." In this application the words "tossed salads" and "pasta" have the same meaning as is reported in a well known cook books, such as "Good Housekeeping Cook Book [1]".

[1] A standard cook book in U.S.A.

Most people in a pinch would accept and try to use any long handled fork or spoon to do the mixing or "tossing". However, it is significant that you don't want to bruise and cause "rust" on the lettuce and similar vegetables, which happens with the sharper narrower regular cutlery long handled tools. Therefore the long handled tools are less likely to give a desirable result.

This invention called "Pasta Hands" is a matched pair of spade shaped or substantially rectangular tools specifically designed herein for the service and manipulation of pasta, salads and other similar food products. However, this is not a utensil designed for eating such as a fork, spork or spoon.

Although pasta or food serving utensils are already available, many of them are single handed servers with a pencil-like appearance. The subject invention overcomes this by having short and broad spade like aspects.

OBJECT OF THE INVENTION

The present invention is a device that easily, rapidly, and unbruisingly can be used to mix the dressing and salads and pasta components to that each piece of lettuce or other leafy material is coated with the dressing and condiments in a relatively short time.

Another object is to provide the "pasta hands" that will make useful and efficient tool for salad and pasta presentation, in homes, restaurants and other places that serve pasta and other food items.

A still further objective is to provide "pasta hands" that are compact, durable and reusable, and with modifications to make the instrument easier to grip, and store. Also the device will work with more than two tines.

Further objectives of the invention will appear as the description continues.

The device is simple, i.e. unitary, in that there are no pins. It can be used one handed or two handed (with two individual tools), and the two handed model uses two individual identical tools, that coact with each other to pick up not only the large leafy parts of the salad, pasta or condiments but also picks up the broken bits and juices.

This device is economical to manufacture, since there is only one shape for each of the pair of tools, and the first tool has its protruding elements designed to fit the similar elements of a second mating identical tool or fork.

This device greatly reduces the likelihood of bruising[2] or resulting rust for the leafy vegetables.

[2] as defined in Webster's Dictionary

DETAILED DESCRIPTION

Figure 3:
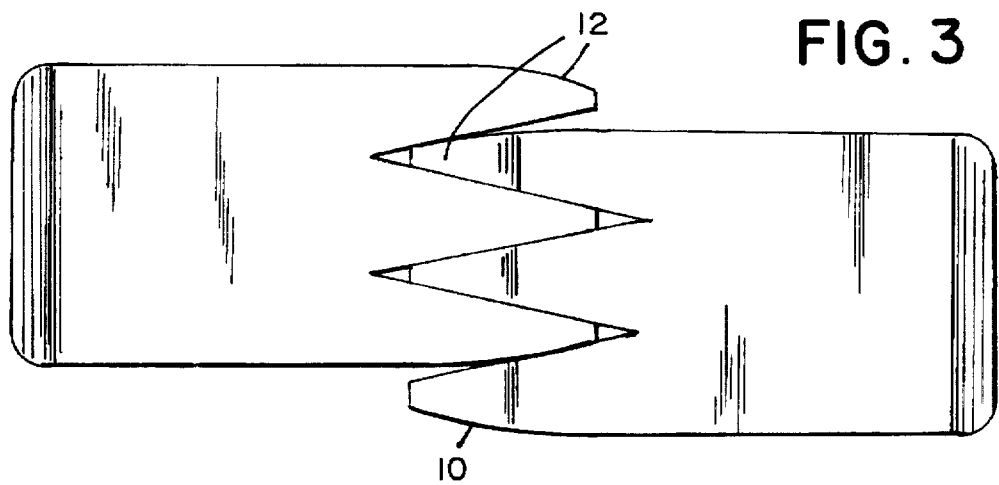
FIG. 3 is a detail plan view of the two forks mating with each other.

FIG. 3 shows the "pasta hands" 10, of generally substantially rectangular shape with two ends generally, and two faces with its enlarged widened handle 11, at it first end; and the protruding elements or tines 12, that may be triangular, extending from its second end having "V" shaped or triangular openings 19, between the protruding tines, or tooth elements 12.

The handle 11, alternatively has individual holes 20, or an individual hole adapted for the four fingers individually 21, or as a group, and is manufactured of wood, metal, or a combination trereof. The number of tines can be varied from two to a multiple for example, six, and may be bent slightly forming a pseudo cup arrangement concave portion of the second face. The handle end can be opened all the way through to form what is known as a "D" handle, to assist in gripping, and ballancing the "pasta hands" when using this device. The "D" shape also provides a hole for hanging the devices to keep them together.

Figure 1A:
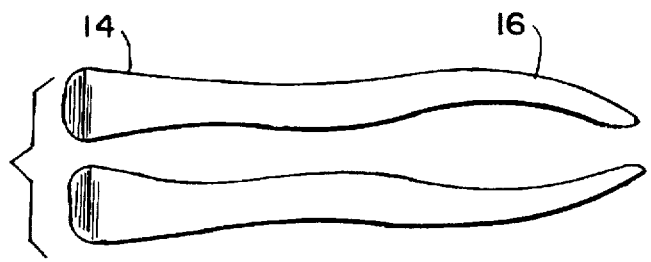
FIG. 1a is a side view of the subject device, with each of the two parts face to face for use.
Figure 1B:
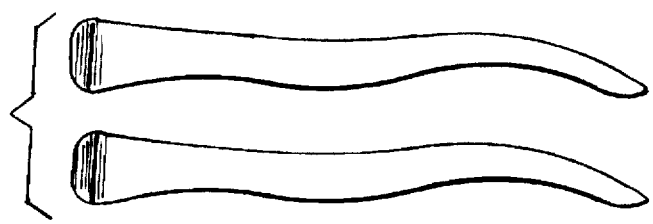
FIG. 1b is a side view of the subject device, with each of the two parts of the device face to back for nesting storage, of these "s" shaped crossection rectangular devices.
Figure 2:
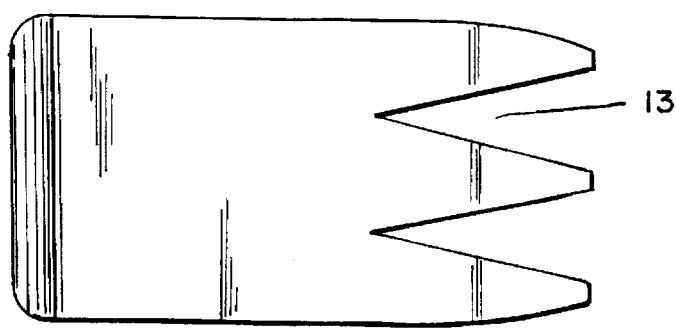
FIG. 2 is a top view of one of the devices of FIG. 1.

FIG. 2 shows the side view of the same devices as FIG. 1 with the heel bulge 14, and the heel pocket 15, at the first end to fit the heel part of the hand of the user. Also, is shown the swell 16, and the "cupped" or "dished" portion 17, of the first face making a generally "S" shaped bend in the substantially rectangular form perpendicularly to the face of the device. This device having protruding triangular elements, or tines 12, and as can be seen by detail of FIG. 3 the pointed portion, 18 of one tool can neatly rest in the "V" base portion 19, of the other tool effectively closing the gaps between the tines to keep the juices trapped there between, and thus speed and simplify tossing the salads and pasta.

This device made is substantially rigid material with plane type mating surfaces and all other parts generally convexly rounded is easily fabricated by carving, molding, swaging, or forging. It is made of wood, plastic, or non plastic, or metal. To accomplish the above and all related objectives, this invention may be embodied in the form illustrated in the accompanying drawings. Please note that the drawings are for illustrative purposes only, and that changes may be made in the specific construction illustrated and described within the scope of the claims made in this patent application.

The character of this unique invention is best understood by reference to its structural form (or shape) as illustrated in the drawings. The shape of the invention 10, in FIGS. 1, 2, and 3 was fashioned considering the ergonomics of the human hands; as well as considering the action as an extension of the human hands. It is designed as a pair to fit comfortably, one in each hand, insuring a firm grip with maximum control, during the manipulation, mixing, stirring, and service of food, food parts, and salads.

The manipulation and service of pasta and other food products is easier and faster with the tool pair and more exact (more user friendly) than with other single handed serving devices, and the motions of the hands are not restricted as would be with the hinged or pivoted tongs shown in the prior art. Next, the invention has at least two, or preferably three, thick prongs or tines 12, FIG. 1. This three tined design, at one end of the tool, allows the user to grip the other end, and lift pasta or other food products with two hands gripping each of the handle in order to gather or scoop and control grip the food or food parts to be mixed or served.

Furthermore the invention is characterized by a slightly rounded and wide spade-like handle which makes for comfortable gathering of the food parts to be combined.

The handle is thickened 16, shown in FIG. 1a and 1b, is curvedly thickened at the butt 14, shown in FIG. 2, for a good hand grip, and is further characterized by the "V" shaped openings 13, FIG. 1a, which act as an opposing pair of forks, to provide better and larger area of grip or control while also allowing the "Pasta Hands" interlocking mechanism to catch the relatively small diameter pasta and loose parts or food items.

I claim:

1. A two element utensil designed for the service and manipulation of salad, pasta and other food products comprising:

(a) a pair of scooping and gripping means, each of said scooping and gripping means having a substantially flat rectangular form which in turn has a first end and a second end, a first face and a second face, (b) each of said first ends has at least two thick flattened and elongated triangular tines, said tines of one of the two element utensil is shaped to mesh in opposition with openings between the other of the openings between said tines of the other of the said two element utensil forming a slightly concave first face, substantially without void (c) each of said first end has at least two thick flattened and elongated triangular tines, forming a slightly concave first face, (d) each of said second end is characterized by having a slightly rounded, thickened, and wide, spade like, handle.

2. In a device as claimed in claim 1, wherein the second end first face, is dished out to fit comfortably in the heel of the operators hand.

3. In a device as claimed in claim 1, wherein the second end is characterized by having triangular shaped openings between the said thick flattened and elongated triangular tines, said openings to substantially mate the shape of the other of the said at least two thick flattened and elongated triangular tines when placed in opposition to each other.

4. A device as in claim 1, wherein the said two elements, for the service and manipulation of pasta and other food products: is characterized by having the first of two pieces being identical with the said other, and having at one end a slightly rounded and wide spade like handle.

5. A device as in claim 1, wherein at the opposing end, at least two, means as many as six thick tines formed thereon.

6. A device as in claim 1, wherein said handle thickened at the one end is fitted with openings perpendicularly to the face, to form a "D" shape opening therein, to fit comfortably the four fingers of a hand.

7. A device as in claim 1, wherein said openings, between the tines, co-acts with the other of two identical pieces as an tine opposing pair, to partially mate and catch small diameter pieces of pasta.

8. A device as in claim 1 wherein the elements of the utensil are additionally characterized by having an "s" shaped bend perpendicularly to the face, of said substantially flat rectangular device.

* * * * *